(12) United States Patent
Germain et al.

(10) Patent No.: US 7,293,780 B2
(45) Date of Patent: Nov. 13, 2007

(54) VEHICLE ROLL CONTROL SYSTEM

(75) Inventors: Philippe Germain, Montreuil (FR); Robin Oakley, Trumilly (FR); Bruno Perree, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 382 days.

(21) Appl. No.: 10/972,617

(22) Filed: Oct. 25, 2004

(65) Prior Publication Data

US 2005/0082781 A1    Apr. 21, 2005

(51) Int. Cl.
*B60G 27/073* (2006.01)

(52) U.S. Cl. .............................. 280/5.506; 280/124.16; 280/124.161; 280/5.508; 280/124.106

(58) Field of Classification Search ............. 280/5.505, 280/5.506, 5.511, 124.157, 124.16, 124.161, 280/5.507, 124.106, 5.508
See application file for complete search history.

(56) References Cited

U.S. PATENT DOCUMENTS

| | | | | |
|---|---|---|---|---|
| 5,362,094 A | * | 11/1994 | Jensen ................. | 280/124.107 |
| 5,431,431 A | * | 7/1995 | Fulks et al. .............. | 280/5.511 |
| 5,630,623 A | * | 5/1997 | Ganzel ................. | 280/124.106 |
| 6,254,108 B1 | * | 7/2001 | Germain et al. .......... | 280/5.506 |
| 6,276,693 B1 | * | 8/2001 | Oakley et al. ........... | 280/5.506 |
| 6,517,094 B1 | * | 2/2003 | Kincaid et al. ....... | 280/124.106 |
| 6,520,510 B1 | * | 2/2003 | Germain et al. ......... | 280/5.511 |
| 6,533,294 B1 | * | 3/2003 | Germain et al. ......... | 280/5.511 |
| 7,055,832 B2 | * | 6/2006 | Germain .................. | 280/5.508 |
| 2003/0047898 A1 | | 3/2003 | Nagy et al. | |
| 2004/0090019 A1 | * | 5/2004 | Germain .................. | 280/5.502 |
| 2005/0280237 A1 | * | 12/2005 | Stacey et al. .......... | 280/124.16 |

FOREIGN PATENT DOCUMENTS

| | | |
|---|---|---|
| DE | 10009918 | 9/2001 |
| EP | 0963868 | 12/1999 |
| EP | 1103395 | 5/2001 |

* cited by examiner

*Primary Examiner*—Ruth Ilan
(74) *Attorney, Agent, or Firm*—Scott A. McBain

(57) ABSTRACT

A vehicle roll control system for a vehicle has a hydraulic actuator attached to a torsion bar. The system includes first and second pressure control valves fluidly connected in series between a pressure source and a reservoir, and a directional valve fluidly connected between the pressure control valves and the hydraulic actuator. The control valves are actuated to control the fluid pressure within the hydraulic actuator to either extend or compress the hydraulic actuator based on the detection of a predetermined vehicle condition for controlling vehicle roll.

20 Claims, 12 Drawing Sheets

VEHICLE ROLL CONTROL SYSTEM

TECHNICAL FIELD

The present invention relates to a roll control system for a motor vehicle.

BACKGROUND OF THE INVENTION

EP-A-1103395 discloses a vehicle roll control system in which a pair of directional valves and a pressure control valve are used to control the movement of the piston of a hydraulic actuator. During a change in cornering (left to right turn or vice versa), the switching of the directional valves has to be controlled in such a manner that roll control of the vehicle is discontinuous.

SUMMARY OF THE INVENTION

The aim of the present invention is to provide a roll control system, which is an improvement to the above-mentioned arrangement.

A vehicle roll control system in accordance with the present invention for a vehicle having a pair of wheels each rotatable on an axle includes a torsion bar; a first arm attached to the torsion bar at one end of the first arm and being connectable to one of the axles at the other end of the first arm; a hydraulic actuator attached to the torsion bar; and control means connected to the hydraulic actuator and controlling the operation thereof on detection of a predetermined vehicle condition; wherein the hydraulic actuator includes a housing, a piston making a sealing sliding fit inside the housing to define a first fluid chamber and a second fluid chamber, and a piston rod connected to the piston and extending through the second fluid chamber and out of the housing; wherein the control means acts on detection of the predetermined vehicle condition either to apply fluid pressure to the first and second fluid chambers with a substantially fixed pressure differential when the piston tends to move in a first direction to extend the hydraulic actuator, or to apply a fluid pressure to the second fluid chamber above the fluid pressure in the first fluid chamber whilst maintaining the fluid pressure in the first fluid chamber substantially constant when the piston tends to move in a second direction to compress the hydraulic actuator; and wherein the control means includes a source of fluid pressure, a fluid reservoir, first and second pressure control valves fluidly connected in series between the pressure source and the reservoir, and a directional valve fluidly connected between the pressure control valves and the hydraulic actuator, wherein the pressure control valves are actuated to control the fluid pressure in the first and second fluid chambers.

The present invention provides active roll control in which roll control can be substantially continuous during a change in cornering.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
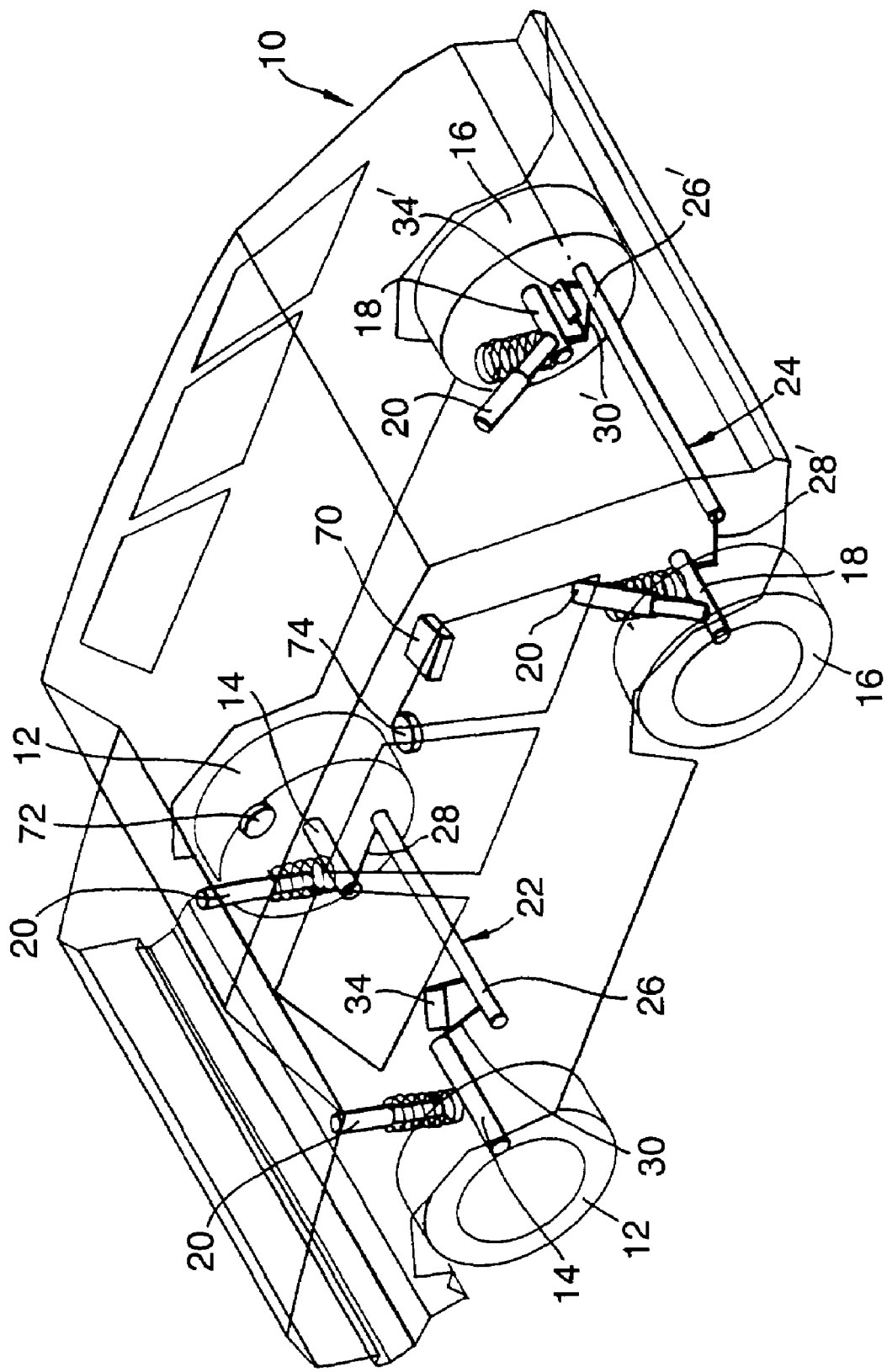
FIG. 1 is a schematic presentation of a vehicle incorporating a vehicle roll control system in accordance with the present invention.

Referring to FIG. 1, a vehicle 10 is shown schematically and comprises a pair of front wheels 12 each rotatably mounted on an axle 14, a pair of rear wheels 16 each rotatably mounted on an axle 18, and a shock absorbing system 20 associated with each wheel. A portion 22 of a vehicle roll control system in accordance with the present invention is associated with the front wheels 12, and a portion 24 of the vehicle roll control system in accordance with the present invention is associated with the rear wheels 16. The portions 22, 24 are substantially the same but with modifications made solely to allow fitting to the vehicle 10.

Figure 2:
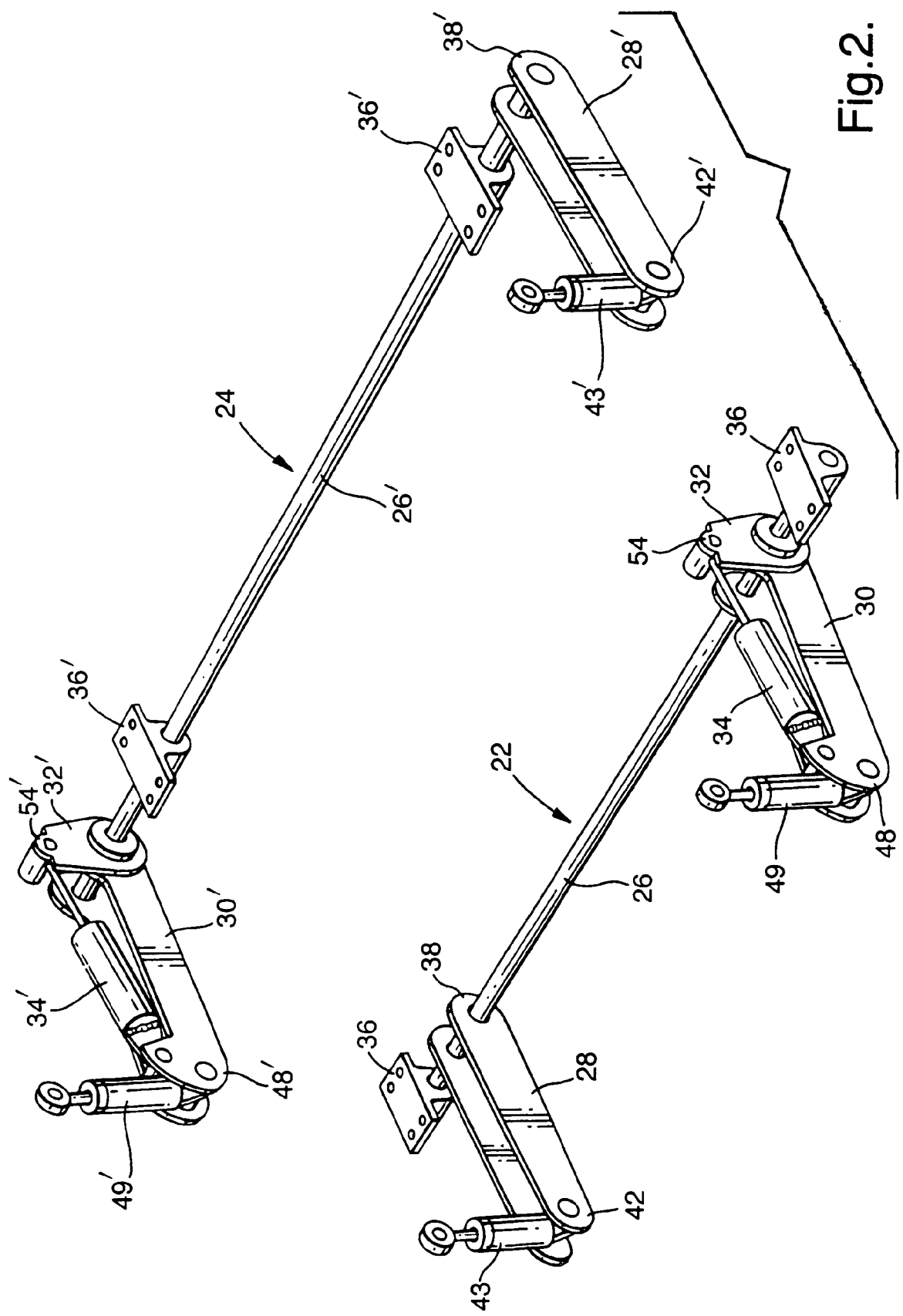
FIG. 2 is an enlarged view of the front and rear portions of the vehicle roll control system shown in FIG. 1.
Figure 3:
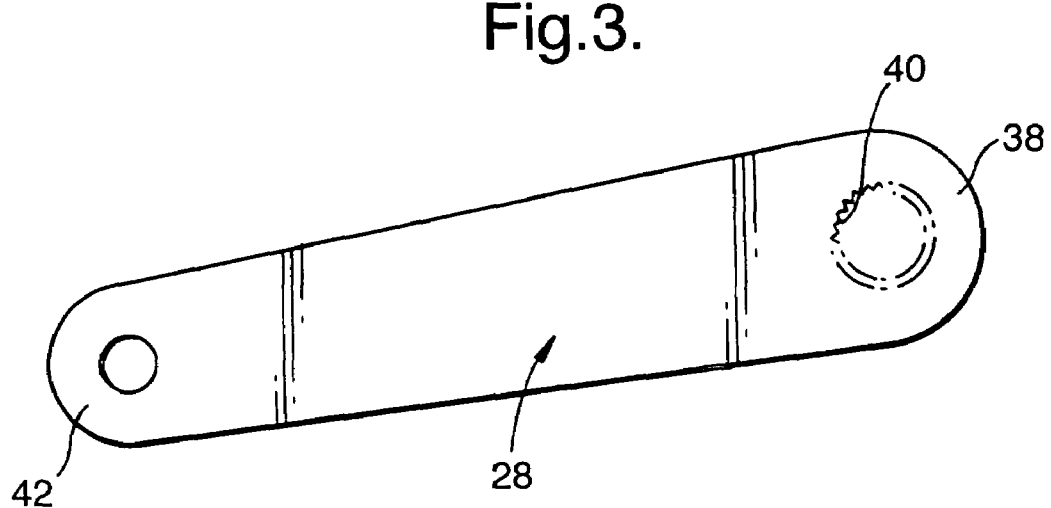
FIG. 3 is a side view of the first arm of the vehicle roll control system shown in FIG. 2.
Figure 4:
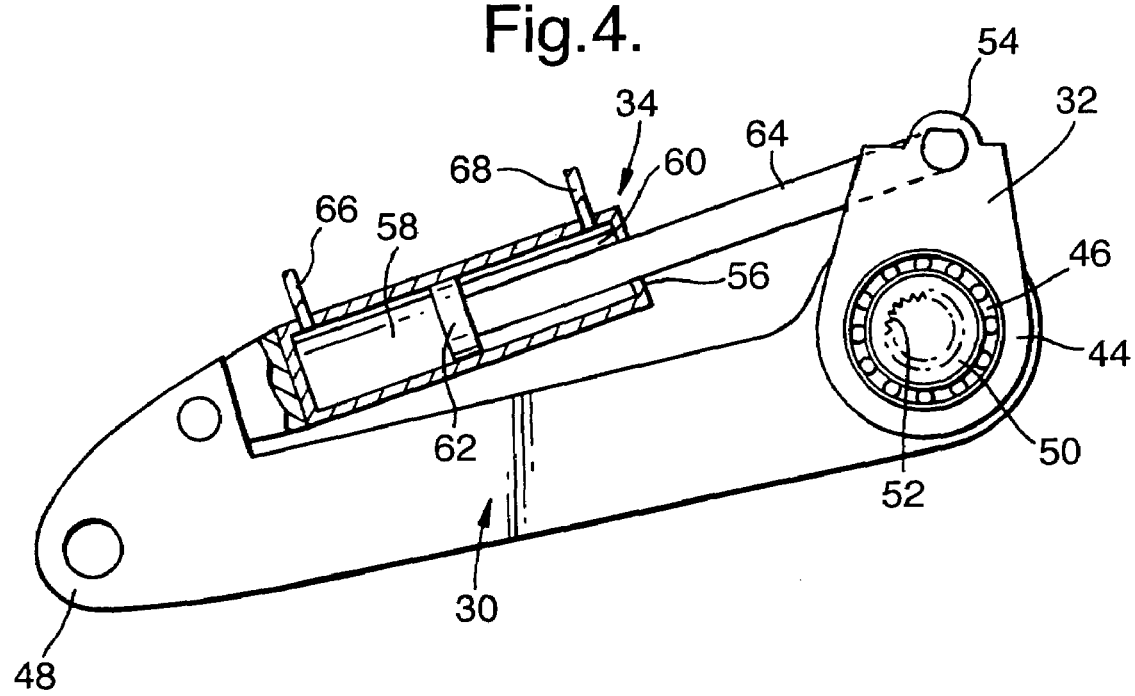
FIG. 4 is a side view of the second arm, hydraulic actuator (shown in cross-section) and lever arm of the vehicle roll control system shown in FIG. 2.

Referring in more detail to FIGS. 2 to 4, the portion 22 of the vehicle roll control system for the front of the vehicle comprises a torsion bar 26, a first arm 28, a second arm 30, a lever arm 32, and a hydraulic actuator 34. The torsion bar 26 is mounted on the vehicle by a pair of resilient mounts 36 in conventional manner to extend longitudinally between the wheels 12. The first arm 28 (FIG. 3) is fixed at one end 38 by a splined connection 40 to the torsion bar 26. The other end 42 of the first arm 28 is connected to the axle 14 of one of the front wheels 12 by a tie rod 43. The second arm 30 (FIG. 4) is rotatably mounted at one end 44 on the torsion bar 26 by way of a bearing 46. The other end 48 of the second arm 30 is connected to the axle 14 of the other front wheel 12 by a tie rod 49. The first and second arms 28,30 extend substantially parallel to one another when the vehicle is stationary, and substantially perpendicular to the torsion bar 26.

The lever arm 32 (FIG. 4) is fixed at one end 50 to the torsion bar 26 by a splined connection 52 substantially adjacent the one end 44 of the second arm 30 and the bearing 46. The lever arm 32 extends substantially perpendicular to the torsion bar 26 to a free end 54. The hydraulic actuator 34 (FIG. 4) extends between, and is connected to, the free end 54 of the lever arm 32 and the other end 48 of the second arm 30. The hydraulic actuator 34 comprises a housing 56, which defines first and second fluid chambers 58,60 separated by a piston 62, which makes a sealing sliding fit with the housing. As shown in FIG. 4, the housing 56 is connected to the other end 48 of the second arm 30, and the piston 62 is connected to the free end 54 of the lever arm 34 by a piston rod 64, which extends through the second fluid chamber 60. It will be appreciated that these connections may be reversed. The fluid chambers 58,60 contain hydraulic fluid and are fluidly connected to fluid lines 66, 68 respectively. The portion 24 of the vehicle roll control for the rear of the vehicle is substantially the same, but with the components (which are primed) having a different layout.

Figure 5:
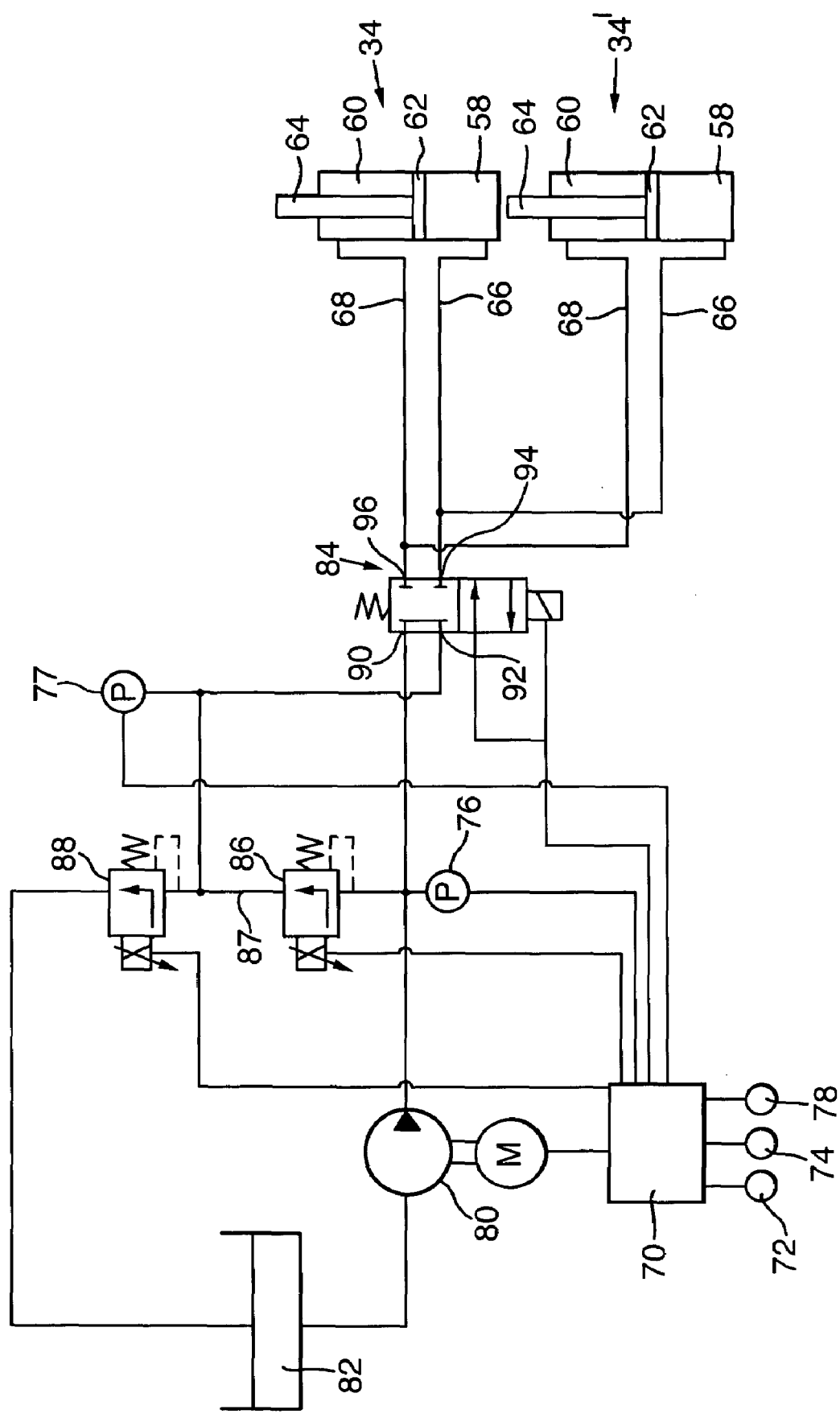
FIG. 5 is a schematic diagram of the hydraulic and electrical control circuit of the vehicle roll control system shown in FIG. 1 when the directional valve is de-energized.
Figure 6:
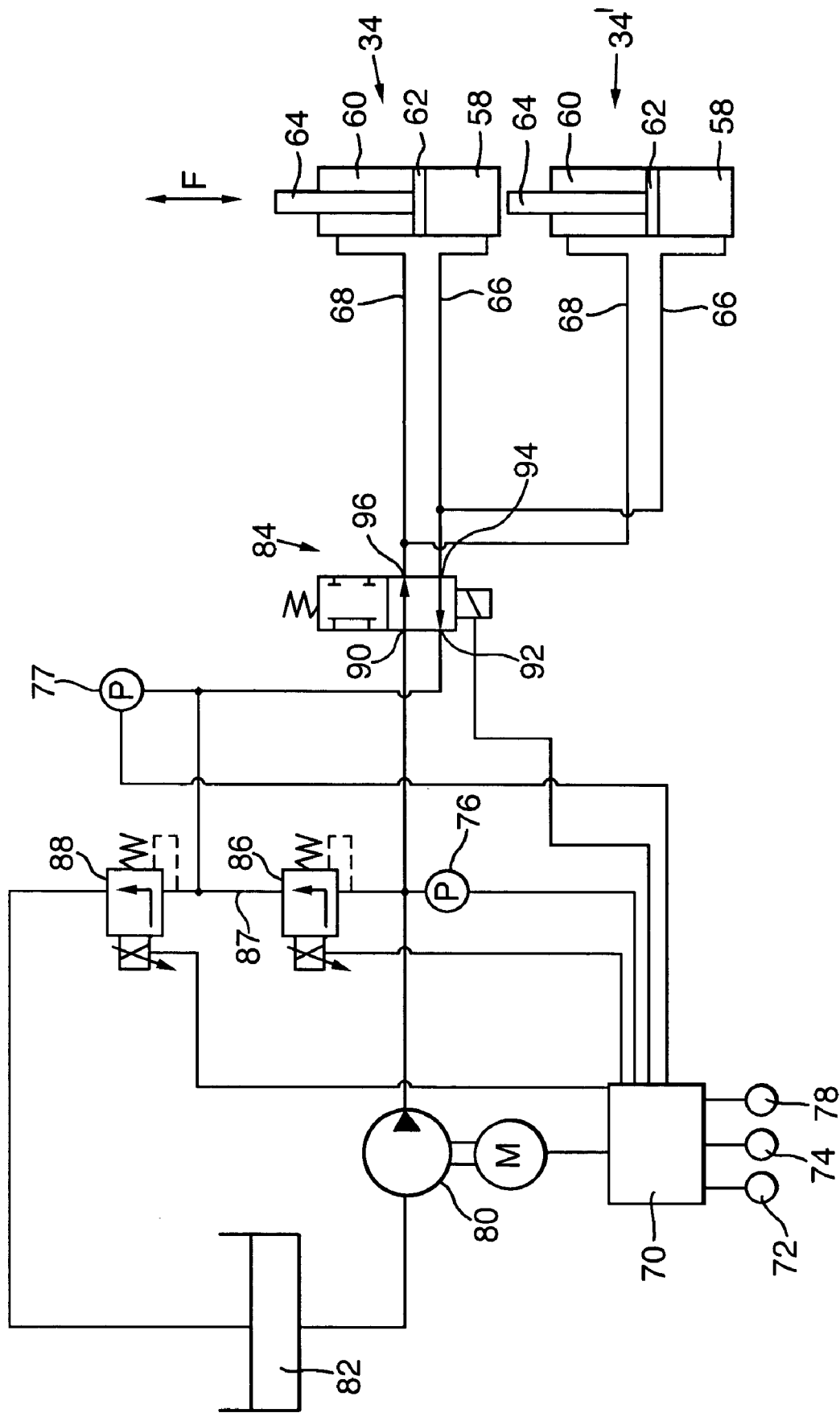
FIG. 6 is a schematic diagram of the hydraulic and electrical control circuit of FIG. 5 when the directional valve is actuated.

The hydraulic and electrical control circuit of the vehicle roll control system is shown in FIGS. 5 and 6. The hydraulic circuit includes a fluid pump 80, a fluid reservoir 82, a directional valve 84, a first pressure control valve 86, and a second pressure control valve 88. The first pressure control valve 86 has an input fluidly connected to the output of the pump 80 and an output fluidly connected to the input to the second pressure control valve 88. The second pressure control valve 88 has an output fluidly connected to the input to the reservoir 82.

The directional valve 84 has a first port 90 fluidly connected to the output of pump 80; a second port 92 fluidly connected to fluid line 87 connecting the first and second pressure control valves 86,88; a third port 94 fluidly connected to the fluid line 66 and the first fluid chamber 58 of each hydraulic actuator 34,34'; and a fourth port 96 fluidly connected to the fluid line 68 and the second fluid chamber 60 of each hydraulic actuator. The directional valve 84 is solenoid actuated, and has a de-energized state (FIG. 5) in which the first and second ports 90, 92 are fluidly connected, and the third and fourth ports 94,96 are isolated from one another and from the other ports, and an energized or actuated state (FIG. 6) in which the first port 90 is fluidly connected with the fourth port 96, and in which the second port 92 is fluidly connected with the third port 94.

The pump 80 may be driven by the vehicle engine and hence continuously actuated. Alternatively, the pump 80 may be driven by an electric motor or any other suitable means, either continuously, or variably. The pressure control valves 86,88 are actuated to adjust the fluid pressure in the hydraulic system between a predetermined minimum pressure and a predetermined maximum pressure, and to adjust the pressure differential between the first and second chambers 58,60 of each hydraulic actuator 34,34' (when the directional valve 84 is actuated).

The electrical control circuit includes an electronic and/or computerized control module 70. The control module 70 operates the fluid pump 80, the directional valve 84, and the pressure control valves 86,88, when required. The control module 70 actuates the valves 84,86,88 dependent on predetermined vehicle conditions which are determined by signals from one or more sensors, such as a pressure sensor 76 (which detects the presence of fluid pressure in the hydraulic circuit), a pressure sensor 77 (which detects the fluid pressure in line 87), a lateral g sensor 74 (which monitors the sideways acceleration of the vehicle), a steering sensor 72 (which monitors the steering angle of the front wheels 12), a vehicle speed sensor 78, and/or any other relevant parameter.

Figure 14:
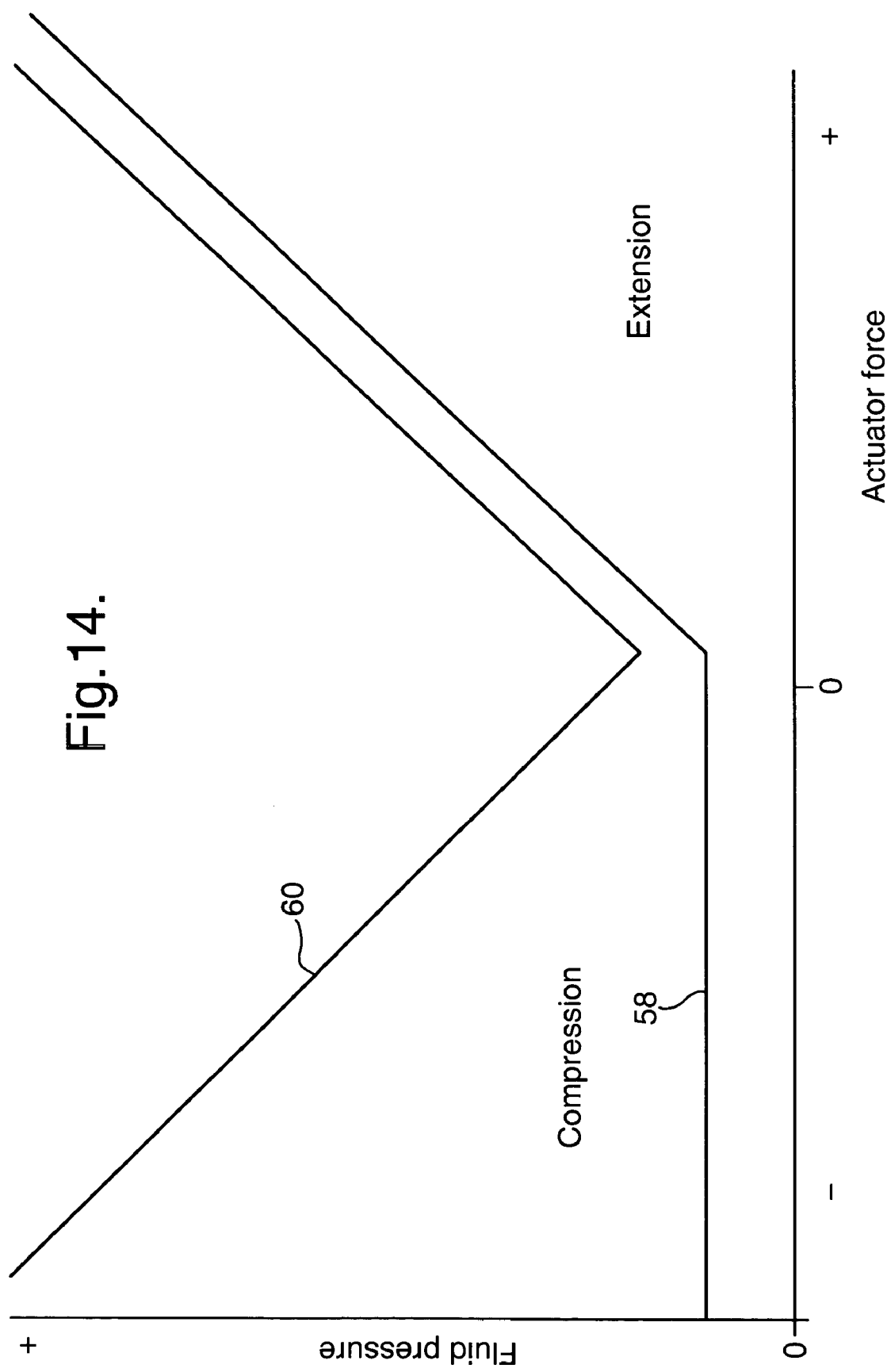
FIG. 14 is a graph of fluid pressure against actuator force.

If the control module 70 detects that roll control is required (due, for example, to cornering of the motor vehicle 10), the control module determines if the module has to generate a force F which acts on the piston rod 64 to extend the actuators 34,34', or to compress the actuators, in an axial direction. For extension, the control module 70 actuates the pressure control valves 86,88 to provide a predetermined fluid pressure in each of the first and second fluid chambers 58,60, which correlates with the force F, and sets the directional valve 84 in the actuated position as shown in FIG. 6. In this case, the pressure differential between the first and second chambers 58,60 is maintained substantially constant as the level of the fluid pressure increases or decreases as required. For compression, the control module 70 actuates the pressure control valves 86,88 to provide a substantially constant fluid pressure in the first chamber 58 and a predetermined fluid pressure in the second chamber 60 (which is greater than the fluid pressure in the first chamber) which correlates with the force F, and again sets the directional valve 84 in the actuated position as shown in FIG. 6. In this case, the pressure differential between the first and second chambers 58,60 varies as the fluid pressure in the second chamber increases or decreases. A graph illustrating the fluid pressure in the first and second chambers 58,60 when the actuator 34,34' is subjected to a compression force or an extension force is shown in FIG. 14.

If the control module 70 detects, for example, that the vehicle is travelling in a straight line, the control module actuates the pressure control valves 86,88 and the directional valve 84, and generates fluid pressure in the first and second chambers 58,60 such that the actuators 34,34' neither extend nor compress in the axial direction.

By suitable dimensions for the actuators 34,34', the output force from the actuators can be made substantially the same irrespective of the direction of motion of the piston 62.

In the failure mode, or during certain diagnostics, the directional valve 84 is de-energized (as shown in FIG. 5) such that the hydraulic actuators 34,34' are locked. Fluid can freely flow within the hydraulic system between the pump 80 and the reservoir 82 by way of the first and second ports 90,92 of the directional valve 84, and the second pressure control valve 88 (which may include a pressure relief valve). As the third and fourth ports 94,96 of the directional valve 84 are closed and isolated, the actuators 34,34' are effectively locked.

Figure 7:
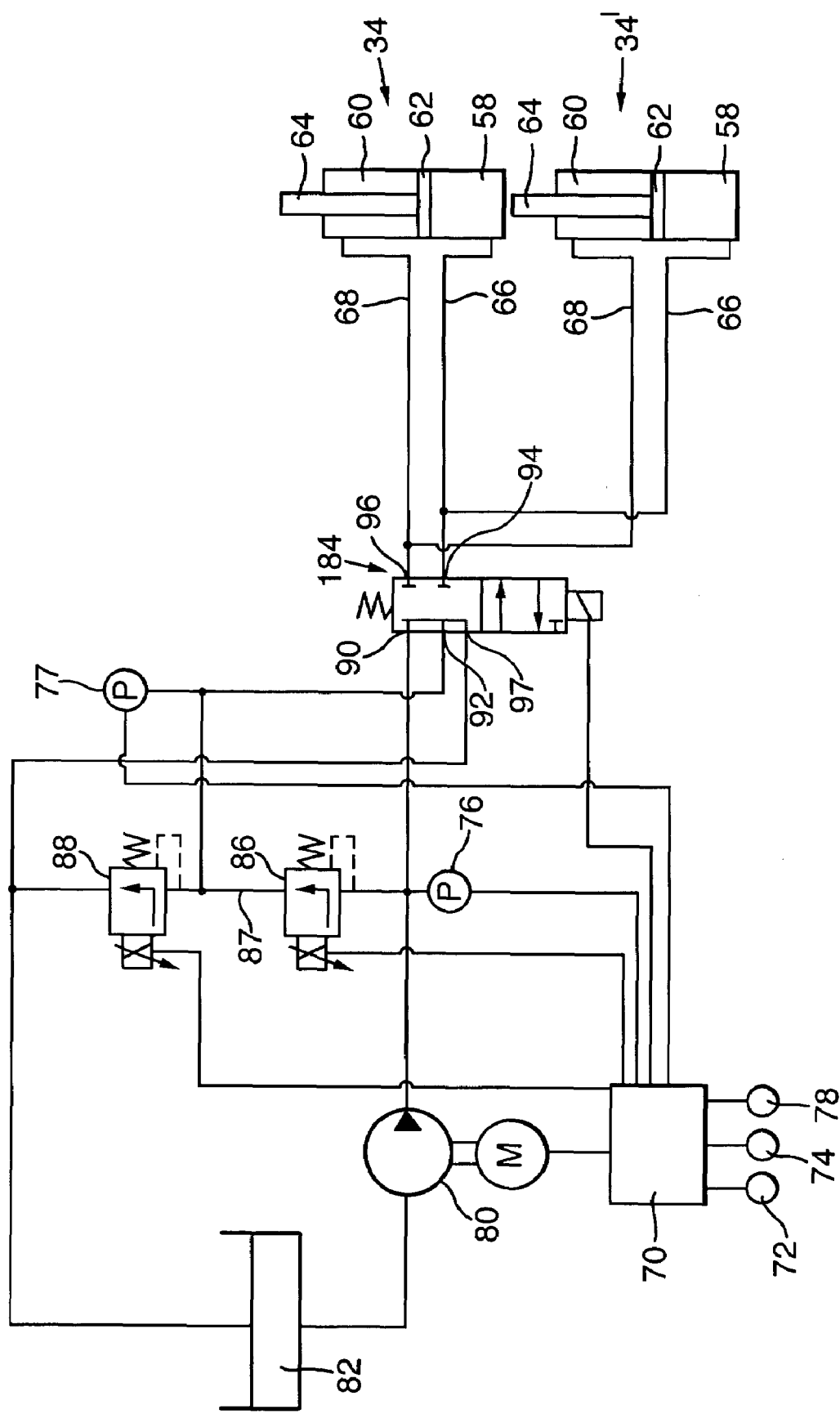
FIG. 7 is a schematic diagram of a first alternative arrangement for the hydraulic circuit of a vehicle roll control system in accordance with the present invention when the directional valve is de-energized.

FIG. 7 shows a first alternative arrangement for the hydraulic circuit in which (in comparison to FIGS. 5 and 6) like parts have been given the same reference numeral. In this first alternative, the directional valve 184 has a fifth port 97 fluidly connected to the input of the fluid reservoir 82. In the de-energized state of the directional valve 184, the first, second and fifth ports 90,92,97 are fluidly connected with each other and to the fluid reservoir 82. In the energized or actuated state of the directional valve 184, the fifth port 97 is fluidly isolated from the other ports 90-96. The presence of the fifth port 97 removes the need for actuation of the second pressure control valve 88 (when the directional valve 184 is de-energized), or the presence of a pressure relief for the second pressure control valve. Other features and operation of this first alternative hydraulic circuit in a vehicle roll control system in accordance with the present invention are as described above in respect of FIGS. 1 to 6, and 14.

Figure 8:
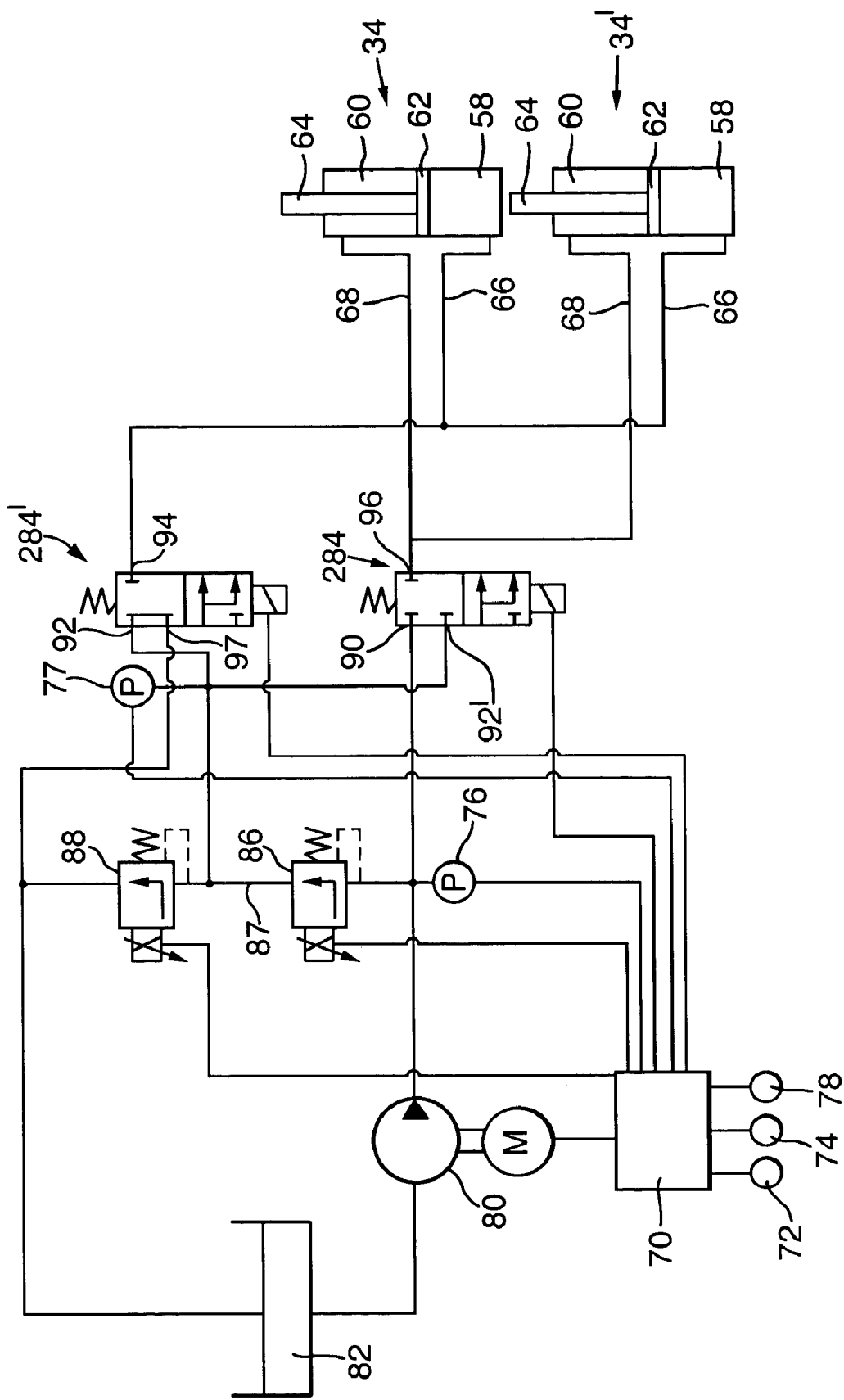
FIG. 8 is a schematic diagram of a second alternative arrangement for the hydraulic circuit of a vehicle roll control system in accordance with the present invention when the directional valve is de-energized.

FIG. 8 shows a second alternative arrangement for the hydraulic circuit in which (in comparison to FIGS. 5 and 6)

like parts have been given the same reference numeral. In this second alternative, the directional valve 284 has been split into two parts, a first part 284' and a second part 284". The two parts 284',284" of the direction valve 284 are actuated separately, but in unison. The first part 284' of the directional valve 284 incorporates the first port 90, and the fourth port 96 which is fluidly connected with the second fluid chambers 60 of the hydraulic actuators 34,34'. The second part 284" of the directional valve 284 incorporates the second port 92, and the third port 94 which is fluidly connected with the first fluid chambers 58 of the hydraulic actuators 34,34'. The first part 284' of the directional valve 284 has an additional port 92' which is fluidly connected with the second port 92 of the second part 284". The second part 284" of the directional valve 284 has an additional port 97 which is fluidly connected with the input of the fluid reservoir 82. In the de-energized state of the first and second parts 284',284" of the directional valve 284, the first port 90 is fluidly connected with the fluid reservoir 82 by way of ports 92',92 and 97 as shown in FIG. 8. In the energized state of the first and second parts 284',284" of the directional valve 284, the ports 92' and 97' are fluidly isolated from the other ports in the same part. The presence of the ports 92',97 removes the need for actuation of the second pressure control valve 88 (when the directional valve 284 is de-energized), or the presence of a pressure relief for the second pressure control valve. Other features and operation of this second alternative hydraulic circuit in a vehicle roll control system in accordance with the present invention are as described above in respect of FIGS. 1 to 6, and 14.

In the present invention, the directional valve 84, 184, 284 is energized when roll control is required, irrespective of the direction of turn of the vehicle. The fluid pressure in the first and second fluid chambers 58,60 of the hydraulic actuators 34,34' is controlled by the actuation of the first and second pressure control valves 86,88. By adjusting the actuation of the first and second pressure control valves 86,88, the hydraulic actuators 34,34' are actuated for compression or extension dependent on the direction of turn of the vehicle. Consequently, the roll control system of the present invention controls vehicle roll during a change in the direction of turn of the vehicle by adjusting the operation of the first and second pressure control valves 86,88. Such an arrangement provides a smooth transition between left and right turns.

Figure 9:
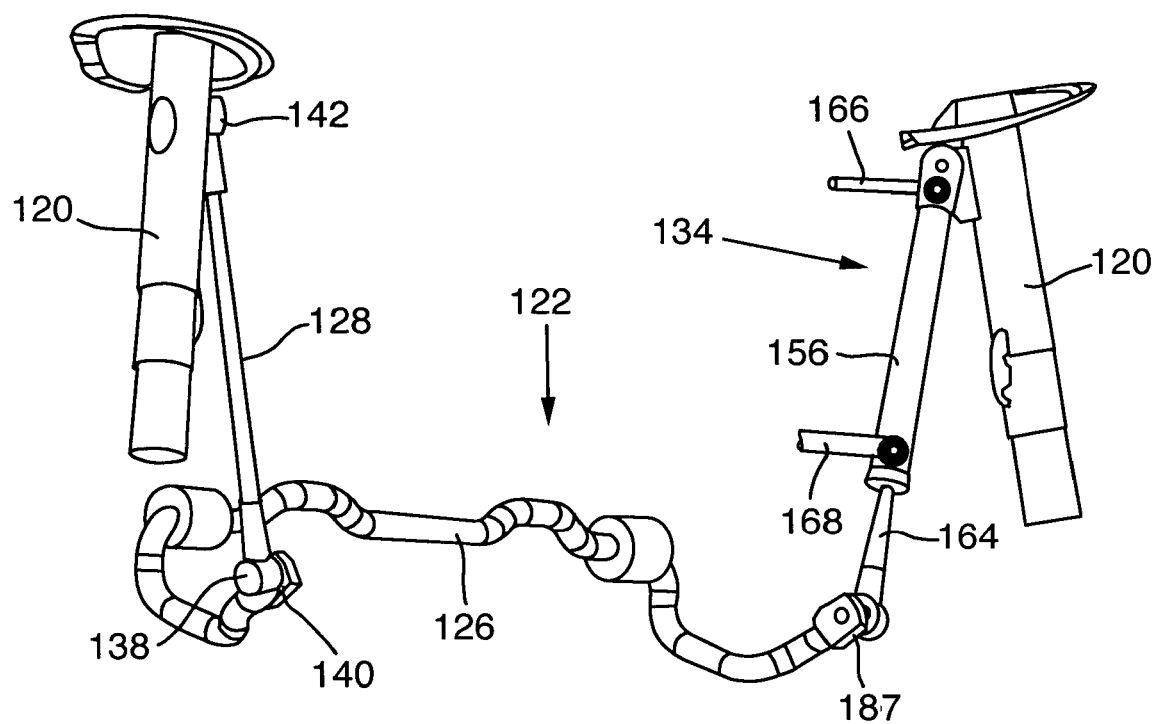
FIG. 9 is a view of a portion of a vehicle roll control system in accordance with a second embodiment of the present invention.

The present invention is also applicable for use with a vehicle roll control system, the front portion 122 of which is as shown in FIG. 9 and the rear portion of which is substantially identical to the front portion. In this embodiment in accordance with the present invention, the front portion 122 comprises a torsion bar 126, a first arm 128, and a hydraulic actuator 134. The first arm 128 is fixed at one end 138 to one end 140 of the torsion bar 126. The other end 142 of the first arm 128 is connected to one of the shock absorbers 120. The hydraulic actuator 134 has a piston rod 164, which is fixed to the other end 187 of the torsion bar 126. The housing 156 of the actuator 134 is connected to the other shock absorber 120. The hydraulic actuator 134 is substantially the same as the actuator 34 described above with reference to FIGS. 1 to 6, and has a fluid line 166 connected to a first fluid chamber inside the housing, and another fluid line 168 connected to a second fluid chamber inside the housing. The first and second fluid chambers inside the housing 156 are separated by a piston secured to the piston rod 164. The fluid lines 166,168 for each hydraulic actuator are connected to a hydraulic circuit as shown in FIGS. 5 and 6, which is controlled by a control circuit as shown in FIGS. 5 and 6, or any one of the arrangements shown in FIGS. 7 and 8. The roll control system is operated in substantially the same manner as that described above with reference to FIGS. 1 to 6, and 14, or either one of FIGS. 7 and 8.

Figure 10:
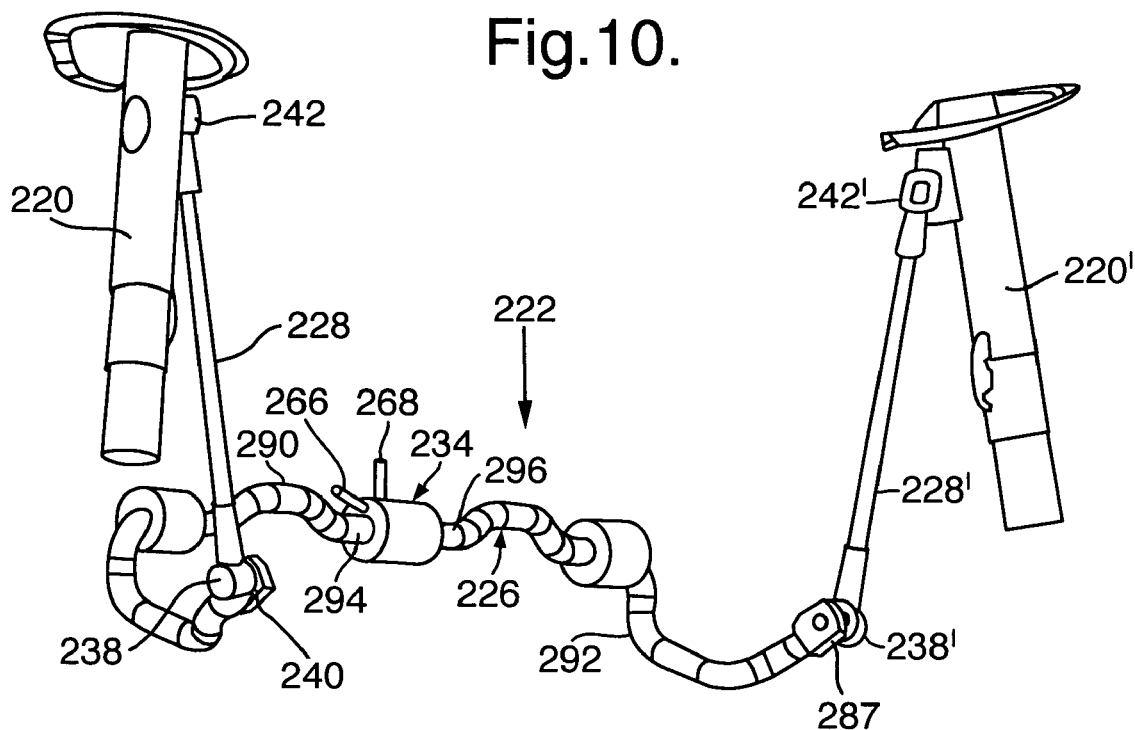
FIG. 10 is a view of a vehicle roll control system in accordance with a third embodiment of the present invention.

The present invention is also applicable for use with a vehicle roll control system as shown in FIG. 10. In this third embodiment in accordance with the present invention, the system 222 comprises a torsion bar 226, a first arm 228, a second arm 228', and a hydraulic actuator 234. The first arm 228 is fixed at one end 238 to one end 240 of the torsion bar 226. The other end 242 of the first arm 228 is connected to one of the shock absorbers 220. The second arm 228' is fixed at one end 238' to the other end 287 of the torsion bar 226. The other end 242' of the second arm 228' is connected to the other shock absorber 220'. The torsion bar 226 is split into first and second parts 290,292, respectively. The first and second parts 290,292 of the torsion bar 226 have portions 294,296, respectively, which are axially aligned. The axially aligned portions 294,296 are connected by a hydraulic actuator 234.

Figure 11:
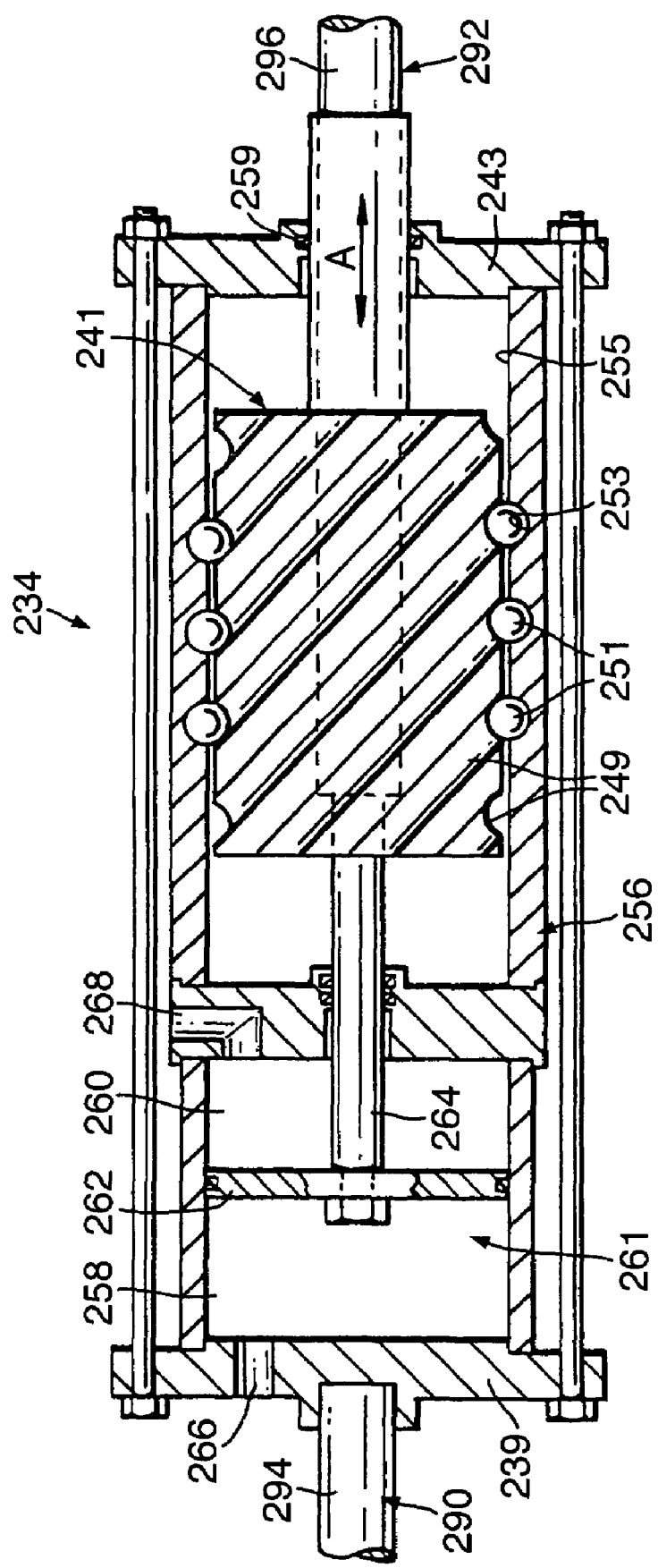
FIG. 11 is a cross-section view of the hydraulic actuator of the vehicle roll control system of FIG. 10.

The hydraulic actuator 234, as shown in FIG. 11, comprises a cylindrical housing 256, which is connected at one end 239 to the portion 294 of the first part 290 of the torsion bar 226. The actuator 234 further comprises a rod 241 positioned inside the housing 256, extending out of the other end 243 of the housing, and connectable to the portion 296 of the second part 292 of the torsion bar 226. The rod 241 has an external screw thread 249 adjacent the housing 256. Balls 251 are rotatably positioned in hemispherical indentations 253 in the inner surface 255 of the housing 256 adjacent the screw thread 249. The balls 251 extend into the screw thread 249. The rod 241 is slidably and rotatably mounted in the housing 256 at the other end 243 by way of a bearing 259 positioned in the other end 243. This arrangement allows the rod 241 to rotate about its longitudinal axis relative to the housing 256, and to slide in an axial direction A relative to the housing. A piston chamber 261 is defined inside the housing 256. The rod 241 sealing extends into the piston chamber 261 to define a piston rod 264, and a piston 262 is secured to the end of the piston rod inside the piston chamber. The piston 262 makes a sealing sliding fit with the housing 256 and divides the chamber 261 into a first fluid chamber 258 and a second fluid chamber 260. The first fluid chamber 258 is fluidly connected to fluid line 266, and the second fluid chamber 260 is fluidly connected to fluid line 268.

The fluid lines 266,268 are connected to a hydraulic circuit as shown in FIGS. 5 and 6, which is controlled by a control circuit as shown in FIGS. 5 and 6, or any one of the arrangements shown in FIGS. 7 and 8. The roll control system 222 is operated in substantially the same manner as that described above with reference to FIGS. 1 to 6, and 14, or any one of FIGS. 7 and 8.

Figure 12:
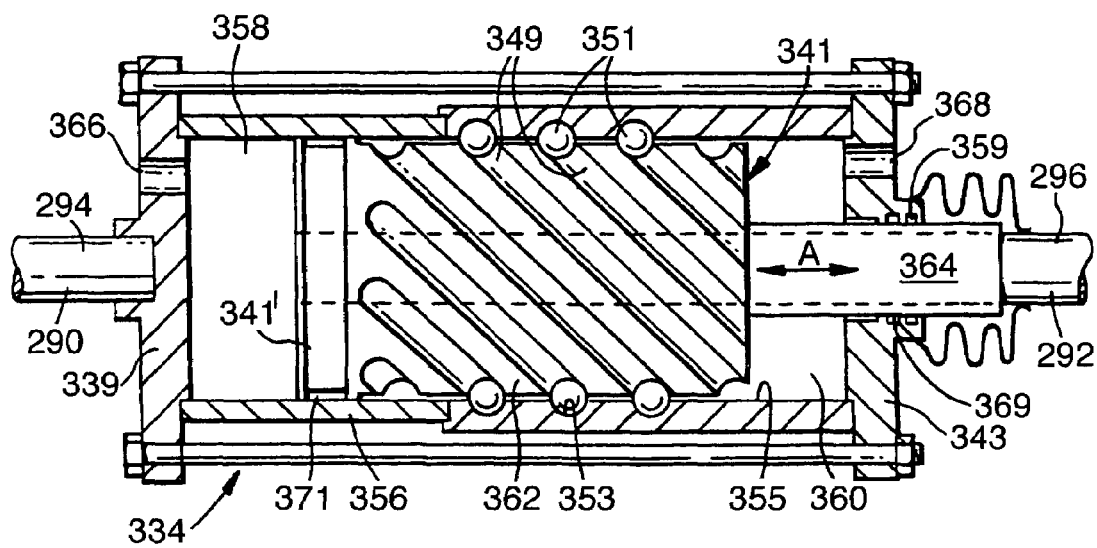
FIG. 12 is a cross-sectional view of an alternative embodiment of hydraulic actuator for the vehicle roll control system of FIG. 10.

An alternative arrangement for the hydraulic actuator of FIG. 11 is shown in FIG. 12. In this alternative embodiment, the actuator 334 comprises a cylindrical housing 356, which is connected at one end 339 to the portion 294 of the first part 290 of the torsion bar 226. The actuator 334 further comprises a rod 341 positioned inside the housing 356, extending out of the other end 343 of the housing, and connectable to the portion 296 of the second part 292 of the torsion bar 226. The rod 341 has an external screw thread 349 adjacent the housing 356. Balls 351 are rotatably positioned in hemispherical indentations 353 in the inner surface 355 of the housing 356 adjacent the screw thread 349. The balls 351 extend into the screw thread 349. The rod 341 is slidably and rotatably mounted in the housing 356 at the other end 343 of the housing by way of a bearing 359 positioned in the other end. The rod 341 makes a sliding guiding fit with the inner surface 355 of the housing 356 at its end 341' remote from the second part 292 of the torsion bar 226. This arrangement allows the rod 341 to rotate about its longitudinal axis relative to the housing 356, and to slide in an axial direction A relative to the housing. First and second fluid chambers 358,360 are defined inside the housing 356. The rod 341 makes a sealing fit with the inner surface 355 of the housing 356 by way of seal 371 to define a piston 362. The first fluid chamber 358 is positioned on one side of the piston 362, and the second fluid chamber 360 is positioned on the other side of the piston. A seal 369 is positioned adjacent the bearing 359. A portion 364 of the rod 341 defines a piston rod, which extends through the second fluid chamber 360. The first fluid chamber 358 is fluidly connected to fluid line 366, and the second fluid chamber 360 is fluidly connected to fluid line 368. The fluid lines 366,368 are fluidly connected with one of the hydraulic circuits shown in FIGS. 5 to 8 to actuate the actuator 334.

Figure 13:
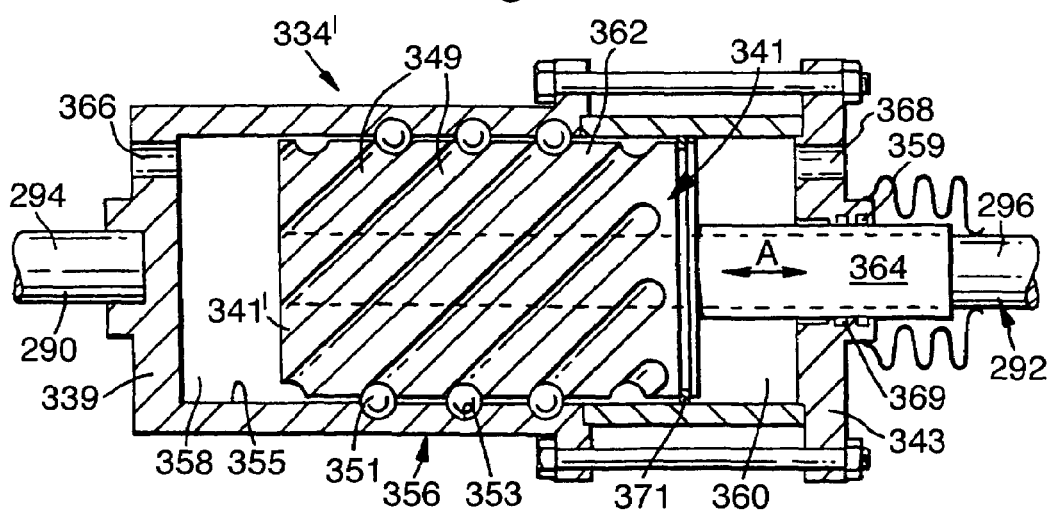
FIG. 13 is a cross-sectional view of a further alternative embodiment of hydraulic actuator for the vehicle roll control system of FIG. 10.

A further alternative arrangement of hydraulic actuator 334' is shown in FIG. 13. In this further alternative embodiment, the actuator 334' is substantially the same as the actuator 334 shown in FIG. 12, but without the sliding guiding fit of the free end 341' of the rod 341 with the housing 356.

In a preferred arrangement, the cross-sectional area of the first fluid chamber of each hydraulic actuator described above is substantially double the cross-sectional area of the piston rod of the hydraulic actuator, when considered on a radial basis. Such an arrangement provides the same output force from the hydraulic actuator in either direction, using the same fluid pressure and equal amounts of fluid.

In the preferred arrangement described above, a hydraulic actuator is provided for both the front of the vehicle and the rear of the vehicle, and these hydraulic actuators are controlled in unison. It will be appreciated that the hydraulic actuators may be controlled individually, and in certain cases the portion of the roll control system at the rear of the vehicle may be omitted. Also, the hydraulic actuator for the front of the vehicle may be a different type to the hydraulic actuator for the rear of the vehicle.

In any of the roll control systems described above, the hydraulic actuator may include a check valve (not shown, but preferably mounted in the piston) which allows flow of hydraulic fluid from the first fluid chamber to the second fluid chamber only when the fluid pressure in the first fluid chamber is greater than the fluid pressure in the second fluid chamber. With such an arrangement, the second fluid chamber can be connected to a reservoir during servicing of the actuator to bleed air from the hydraulic fluid. Also, the presence of the check valve reduces the risk of air being sucked into the second fluid chamber should the fluid pressure in the second fluid chamber fall below the fluid pressure in the first fluid chamber, and provides further improvements in ride comfort.

The invention claimed is:

1. A vehicle roll control system for a vehicle having a pair of wheels each rotatable on an axle, comprising a torsion bar; a first arm attached to the torsion bar at one end of the first arm and being connectable to one of the axles at the other end of the first arm; a hydraulic actuator attached to the torsion bar; and control means connected to the hydraulic actuator and controlling the operation thereof on detection of a predetermined vehicle condition; wherein the hydraulic actuator comprises a housing, a piston making a sealing sliding fit inside the housing to define a first fluid chamber and a second fluid chamber, and a piston rod connected to the piston and extending through the second fluid chamber and out of the housing; wherein the control means acts on detection of the predetermined vehicle condition either to apply fluid pressure to the first and second fluid chambers with a substantially fixed pressure differential when the piston tends to move in a first direction to extend the hydraulic actuator, or to apply a fluid pressure to the second fluid chamber above the fluid pressure in the first fluid chamber whilst maintaining the fluid pressure in the first fluid chamber substantially constant when the piston tends to move in a second direction to compress the hydraulic actuator; and wherein the control means comprises a source of fluid pressure, a fluid reservoir, first and second pressure control valves fluidly connected in series between the pressure source and the reservoir, and a directional valve fluidly connected between the pressure control valves and the hydraulic actuator, wherein the pressure control valves are actuated to control the fluid pressure in the first and second fluid chambers.

2. A vehicle roll control system as claimed in claim 1, wherein the directional valve is fluidly connected in parallel across the first pressure control valve.

3. A vehicle roll control system as claimed in claim 2, wherein the directional valve has a de-energized state in which the first and second fluid chambers of the hydraulic actuator are fluidly isolated from one another and from the pressure control valves.

4. A vehicle roll control system as claimed in claim 1, wherein the directional valve comprises a first part, which is fluidly connected with the second fluid chamber of the hydraulic actuator, and a second part, which is fluidly connected with the first fluid chamber of the hydraulic actuator, the first and second parts being actuable separately and in unison.

5. A vehicle roll control system as claimed in claim 4, wherein the directional valve has a de-energized state in which the first and second fluid chambers of the hydraulic actuator are fluidly isolated from one another and from the pressure control valves.

6. A vehicle roll control system as claimed in claim 1, wherein the directional valve has a de-energized state in which the first and second fluid chambers of the hydraulic actuator are fluidly isolated from one another and from the pressure control valves.

7. A vehicle roll control system as claimed in claim 6, wherein, in the de-energized state, the directional valve fluidly connects the fluid pump to the fluid reservoir.

8. A vehicle roll control system as claimed in claim 6; further comprising a second arm rotatably mounted on the torsion bar at one end of the second arm and being connectable to the other axle at the other end of the second arm; wherein the hydraulic actuator controls the rotation of the second arm relative to the torsion bar.

9. A vehicle roll control system as claimed in claim 8, further comprising a lever arm fixed to the torsion bar at one end of the lever arm adjacent said one end of the second arm, and having a free end at the other end thereof; wherein the hydraulic actuator extends between the second arm and the lever arm, the housing being connected to one of the second arm or the free end of the lever arm, and the piston rod being connected to the other of the second arm or the free end of the lever arm.

10. A vehicle roll control system as claimed in claim 8, further comprising a lever arm fixed at one end of the lever arm to the said other end of the second arm, and having a free end at the other end thereof; wherein the hydraulic actuator extends between the torsion bar and the lever arm, the housing being connected to one of the torsion bar or the free end of the lever arm, the piston rod being connected to the other of the torsion bar or the free end of the lever arm.

11. A vehicle roll control system as claimed in claim 1, wherein the control means further comprises an electronic control module which receives signals dependent on the predetermined vehicle condition, and which controls the operation of the directional valve and the first and second pressure control valves.

12. A vehicle roll control system as claimed in claims 1, wherein the cross-sectional area of the first fluid chamber is substantially double the cross-sectional area of the piston rod.

13. A vehicle roll control system as claimed in claim 1, wherein the hydraulic actuator is attached to the torsion bar at one end of the hydraulic actuator and is connectable to the other axle at the other end of the hydraulic actuator.

14. A vehicle roll control system as claimed in claim 1, wherein the hydraulic actuator is attached directly to the torsion bar at one end of the hydraulic actuator.

15. A vehicle roll control system as claimed in claim 1, wherein the hydraulic actuator is attached to the torsion bar between axially-aligned portions of first and second parts of the torsion bar.

16. A vehicle roll control system as claimed in claim 15, wherein the housing of the hydraulic actuator is connected at one end of the housing to the first part of the torsion bar; wherein the piston rod is positioned inside the housing, is rotatable about its longitudinal axis relative the housing, extends out of the other end of the housing, and is connected to the second part of the torsion bar; the hydraulic actuator further comprising an external screw thread on the piston rod inside the housing; and at least one ball rotatably mounted on the housing and extending into and engaging the screw thread on the piston rod.

17. A vehicle roll control system as claimed in claim 16, wherein each said at least one ball is rotatably mounted in a corresponding hemispherical indentation in the housing.

18. A vehicle roll control system as claimed in claim 17, wherein the piston rod defines the piston which makes a sealing sliding fit with the housing to define the first and second fluid chambers inside the housing.

19. A vehicle roll control system as claimed in claim 1, wherein the hydraulic actuator includes a check valve which allows fluid to flow from the first fluid chamber to the second fluid chamber when the fluid pressure in the first fluid chamber exceeds the fluid pressure in the second fluid chamber.

20. A vehicle roll control system as claimed in claim 19, wherein the check valve is mounted in the piston.

\* \* \* \* \*